United States Patent
Reiter et al.

(10) Patent No.: US 6,877,767 B2
(45) Date of Patent: Apr. 12, 2005

(54) AIRBAG MODULE COMPRISING A RETAINING PLATE FOR SAID AIRBAG

(75) Inventors: Thomas Reiter, Dachau (DE), ade; Thilo Brade, Munich (DE); Hans Michael Kirr, Seefeld (DE); Muhammed-Ali Narin, Munich (DE); Karl-Heinz Sommer, Stockdorf (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 10/332,294

(22) PCT Filed: Jul. 5, 2001

(86) PCT No.: PCT/EP01/07672

§ 371 (c)(1),
(2), (4) Date: Aug. 4, 2003

(87) PCT Pub. No.: WO02/04260

PCT Pub. Date: Jan. 17, 2002

(65) Prior Publication Data

US 2004/0155437 A1 Aug. 12, 2004

(30) Foreign Application Priority Data

Jul. 7, 2000 (DE) .......................................... 100 33 173

(51) Int. Cl.⁷ .............................................. B60R 21/16
(52) U.S. Cl. .................................... 280/728.2; 280/731
(58) Field of Search ............................... 280/728.2, 731

(56) References Cited

U.S. PATENT DOCUMENTS

| | | | |
|---|---|---|---|
| 5,833,266 A | | 11/1998 | Bartoldus et al. ........... 280/43.1 |
| 6,113,136 A | * | 9/2000 | Hamada et al. .............. 280/731 |
| 6,145,872 A | * | 11/2000 | Soderquist et al. ....... 280/728.2 |

FOREIGN PATENT DOCUMENTS

| | | |
|---|---|---|
| DE | 29802731 | 7/1998 |
| DE | 29806402 | 9/1998 |
| DE | 19737067 | 12/1998 |
| EP | 633168 | 1/1995 |
| GB | 2343418 | 5/2000 |

* cited by examiner

Primary Examiner—Eric Culbreth
(74) Attorney, Agent, or Firm—Madson & Metcalf

(57) ABSTRACT

An airbag module having a gas generator (14), an airbag (13), a housing (10), and a retaining part (20) for fixing the airbag fabric against the housing (10), whereby the gas generator (14), which is positionally fixed to the housing (10), and the retaining part (20) are arranged inside the airbag (13). The retaining part (20) is arranged without a force-absorbing fixation between the gas generator (14) and the housing (10) and, during deployment of the airbag (13), is pressed against the gas generator (14) by the airbag fabric extending between the retaining part (20) and the housing (10).

20 Claims, 4 Drawing Sheets

AIRBAG MODULE COMPRISING A RETAINING PLATE FOR SAID AIRBAG

BACKGROUND OF THE INVENTION

1. Field of the Invention

The invention relates to an airbag module with a gas generator, airbag, housing, and retaining unit, whereby the gas generator and the retaining unit are located inside of the airbag, and the gas generator is radially and axially attached to the housing.

2. Description of the Related Art

A related airbag module has been described in EP 0 633 168 B 1. In order for the airbag to receive a gas generator additionally arranged in a gas generator housing, a pocket with two open fabric necks is attached in the area that receives the gas generator on the airbag, which after insertion of the gas generator into the pocket, is folded over, encompassing the gas generator in a labyrinth-like fashion. The gas generator is then firmly connected to the module housing using separate attachment means that penetrate through the fabric layers, especially by means of screw fittings.

The known airbag has the initial disadvantage that the manufacture of the airbag with the attached pocket, as well as the assembly of the airbag module as a whole, is complex. The airbag is inserted into the pocket, and the fabric necks of the airbag must be folded over and aligned in such a way that the attachment means of the housing wall of the module housing can be fed through both fabric necks into the gas generator. As the unfolding and inflating of the airbag results in tensile forces applied to the airbag material, at least for a short period of time, the penetration locations of the attachment means through the airbag material are exposed to heavy stresses, which is why additional reinforcement inserts are often worked into the airbag fabric at such critical stress points.

The same disadvantage also exists with the airbag module disclosed in DE 298 02 731 U1, in which a pot-shaped gas generator is inserted and attached in an opening contained at the bottom of the module housing. An attachment plate arranged in the interior of the airbag pinches the airbag together with the bottom of the housing, and is connected to the housing by means of screw fittings penetrating through the airbag fabric.

A comparable airbag module with the use of a pipe gas generator has been described in DE 298 06 402 U1; however, here an insertion component is arranged in the interior of the airbag and pinched together with the housing. It is also connected to the housing by means of separate screw fittings penetrating through the airbag fabric.

The problem to be solved by the invention, therefore, is to provide an airbag module with the general operational characteristics described but with simplified production and assembly.

The solution of this problem is shown in the content of the patent claims that follow this description, including advantageous embodiments and further developments of the invention.

SUMMARY OF THE INVENTION

In its basic idea, the invention provides that the retaining unit is arranged between the gas generator and the housing without any force-receiving attachment, and it is pressed against the gas generator by the airbag fabric extending between the retaining unit and the housing during the unfolding and inflating of the airbag. In more detail, the retaining unit is defined by the gas generator without any force-fit attachment on the airbag, or the gas generator, or the housing on the side opposite of the gas generator between the housing wall of the module housing and the gas generator. The retaining unit absorbs the forces created during the unfolding and inflating of the airbag, and transfers them to the gas generator and its attachment to the module housing. The attachment of the airbag is achieved in a type of floating bearing, because the airbag fabric is led around the retaining unit inserted into the airbag without any special fixation, or attachment. During inflation of the airbag, which generates stresses and forces, the retaining unit supports itself on the gas generator attached in the module housing due to the tensile forces engaging onto the airbag during its unfolding, and thereby transfers these forces.

The invention combines the advantage that the airbag fabric supports itself over a planar surface on the retaining unit for the transfer of force, and no puncture stress is present. In this way, the use of reinforcement layers in the production of the airbag can be eliminated. The production and assembly of the airbag module are also simplified because no special measure for the attachment of the retaining unit is necessary; merely a sufficiently large opening for sliding the retaining unit in must be provided. As only the gas generator must be attached to the module housing, and insofar as the retaining unit is firmly placed in a loose arrangement in the module housing, the attachment effort in the assembly of the module is kept to a minimum.

Another advantage arises from the close association of the retaining unit and housing wall positioned opposite of the discharge opening. The retaining unit acts to reinforce this area of the module housing so that deformation of the housing wall cannot occur before the airbag is deployed during a brief overpressure in the interior of the module housing caused by activating the gas generator. Therefore, the module housing can be embodied in lighter and more weight-saving designs, and produced from plastic, or die-cast light metal.

According to one embodiment example of the invention, the retaining unit has a contour adjusted to the shape of the housing. This ensures the appropriate engagement of the airbag fabric and a good transfer of forces onto the housing due to the alignment of the housing shape and the shape of the retaining unit.

According to another embodiment example of the invention, the fixing of the position of the retaining unit within the airbag is facilitated. In this embodiment, the retaining unit has at least one tab that protrudes from the level of the retaining unit and that penetrates through the airbag fabric and the housing wall in an assigned opening. In this way, the retaining unit is purposeflully locally fixed opposite of the housing by means of two tabs. This provides the advantage that the airbag can be properly positioned, or its position can be fixed, respectively, with the retaining unit during assembly.

According to another embodiment example of the invention, the retaining unit is deformable. It may transfer stresses on the airbag fabric only after the forces have been absorbed. In this regard it is known from GB 2 343 418 A to improve the pinching in of the airbag fabric between the housing and a flange embodied on the gas generator inserted into the housing in the case of an activation of the gas generator by the fact that the flange is bent by the forces exerted, and the clamping force applied to the airbag fabric is increased.

According to an alternative embodiment examples, the retaining unit can consist of plastic, or can be embodied as a retaining plate consisting of metal. In the case of a metal embodiment, especially the tabs penetrating from the level of the retaining unit can be punched out and bent outward.

According to one embodiment example, the integration of a retaining unit provides the invention with the possibility of equipping the retaining unit with a diffuser for leading gas into the unfolding airbag; such diffusers are generally known.

Since the gas generator is arranged on the inside of the airbag, the retaining unit and the airbag form a closed pressure system, which leads to the fact that the module housing can also be designed as a non-closed system. The forces occurring respectively are transferred from the retaining unit to the gas generator and from it to the faces of the module housing. As the module's longitudinal sides remain nearly free of forces, openings allowing for the entry of the airbag fabric extending across the bottom may be arranged in the area of the bottom of the module housing that extend parallel to the gas generator. In this way, not only can the module housing be embodied with an optimum weight, but the openings in the bottom of the module housing can also serve to reduce dynamic stresses. In the case of high interior pressure, the airbag expands hemispherically into these openings, and especially the occurring dynamic pressure peaks can thereby be attenuated without the use of any additional means.

With regard to the assembly of the airbag module, the airbag has an opening dimensionesufficiently large for inserting the retaining unit, as well as two additional openings for receiving the face ends of the gas generator according to embodiment examples of the invention, whereby the dimensions of the openings in the airbag intended for the attachment of the gas generator on the module housing are adjusted to the respective attachment means provided.

With regard to the attachment of the gas generator in the module housing, the gas generator may be attached on the face wall of the module housing with its face end by means of a screw neck, as well as a bore that can be extended through the face wall of the module housing, and by means of an attached nut. Accordingly, the gas generator may be attached to the module housing at its other face end by means of a collar that can be extended from the exterior through the assigned face wall of the module housing, and that receives a face neck of the gas generator within itself.

According to an embodiment example of the invention, the module housing is embodied with two sidewalls that are arranged to envelope an obtuse angle between them in a tub-like fashion parallel to the longitudinal axis of the gas generator in conical direction, and two face walls each connecting the two sidewalls. The conical embodiment of the module housing results in an improved unfolding of the airbag from out of the module housing.

It can be provided for this purpose that the module housing is embodied asymmetrical to the gas generator with a steeply inclining sidewall, and with a shallow inclining sidewall, whereby the airbag is folded into two folds formed between the gas generator and the two sidewalls in an asymmetrically adjusted fold, and overlaps the gas generator with only one fabric layer.

It may be provided in such an embodiment of the module housing that the retaining unit has a contour adjusted to the shape of the sidewalls.

Insofar as the embodiment of the airbag module according to the invention opens the possibility of embodying the module housing in a lighter, and weight-saving fashion from a corresponding material, a retaining loop may be attached to the housing wall of the module housing opposite of the discharge opening, which is led into the airbag and wraps around the gas generator, in order to avoid a sagging of the respective housing wall of the module housing.

BRIEF DESCRIPTION OF THE DRAWINGS

In order that the manner in which the above-recited and other features and advantages of the invention are obtained will be readily inderstood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIG. 1–6, is not intended to limit the scope of the invention, as claimed, but is merely representative of presently preferred embodiments of the invention.

Figure 1:
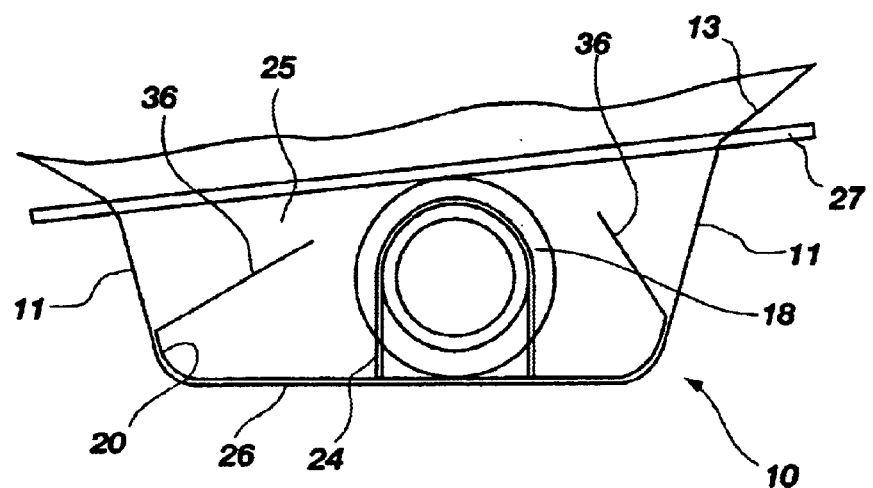
FIG. 1 is a top view of an airbag module.
Figure 2:
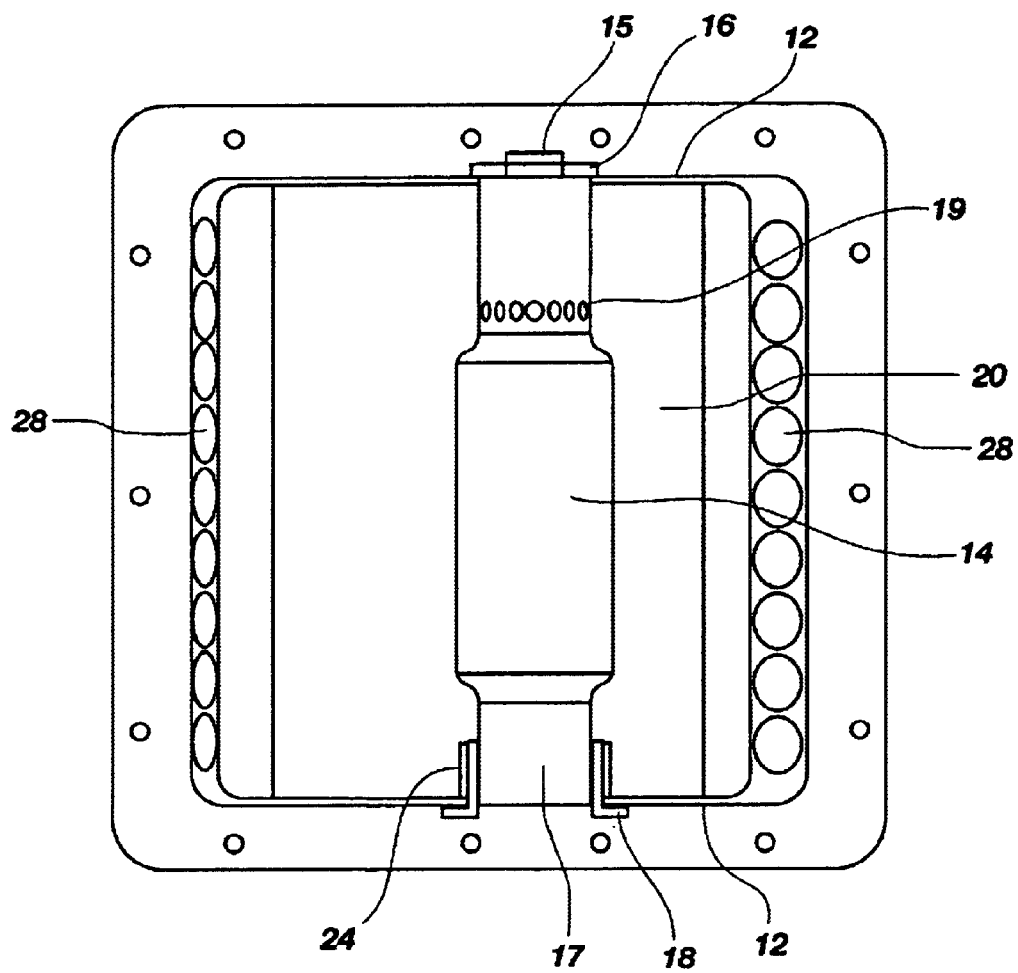
FIG. 2 is a side view of the airbag module of FIG. 1.

The module housing 10 shown in a simultaneous view of FIGS. 1 and 2 is comprised of two opposite sidewalls 11, and face walls 12 that each connect these in a tub-shaped embodiment as a whole, whereby a discharge opening 25 is positioned opposite of the bottom 26 of the module housing 10, through which an airbag 13 that was folded into the module housing 10 can unfold itself. The upper edge of the module housing 10 is equipped with a surrounding flange 27, on which, for example, a cover (not illustrated) can be attached.

A gas generator 14 is arranged on and attached to the module housing 10 between the face walls 12 at a direction parallel to the side walls 11, in that one of the face ends of the gas generator 14 is lead through an assigned opening in the associated face wall 12 of the module housing 10 with a screw neck 15, and a nut 16 is screwed onto the exterior side of the module housing 10 for the attachment of the gas generator 14. On the opposite side the gas generator 14 has a face neck 17 ending inside of the module housing 10, onto which a collar 18 is slid on from the exterior side of the module housing 10. Collar 18 penetrates the assigned face wall 12 through an opening so that the gas generator 14 is fixed above the face neck 17 inside of the collar 18. A retaining loop 24 is provided for the additional fixation and attachment safety of the gas generator 14. Retaining loop 24 envelops the collar 18 in a wrap-around fashion and is attached on the bottom 26 of the module housing. Gas discharge openings 19 through which the gas created in the gas generator 14 enters into the airbag 13 are disposed partially around the gas generator.

The embodiment shown in FIG. 1 shows the retaining unit equipped with an optional diffuser schematically shown at 36 for leading gas into the unfolding airbag; such diffusers are generally known.

Figure 4:
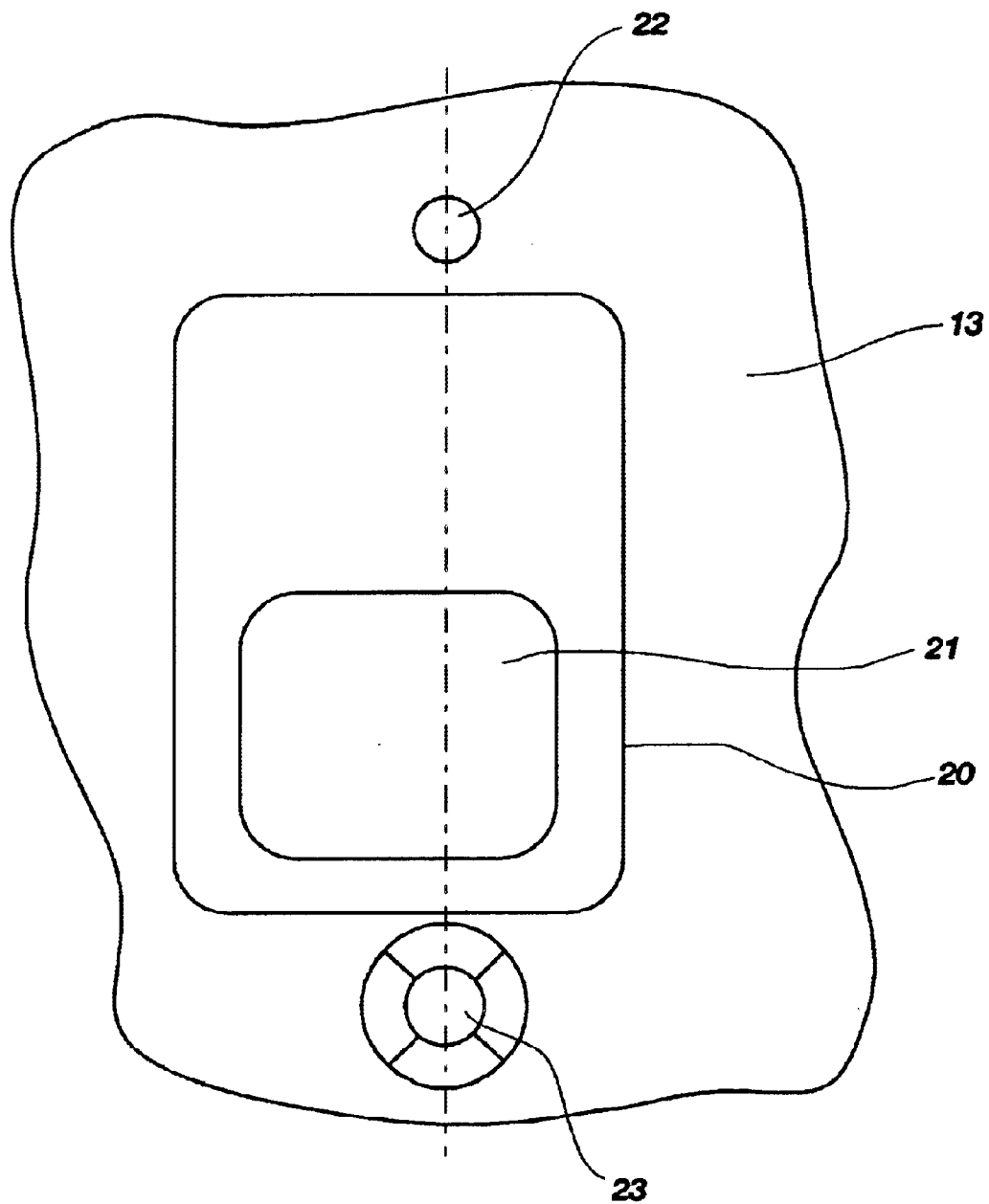
FIG. 4 is a sectional top view of the airbag module.

As FIG. 4 shows in detail, a retaining unit 20 is inserted into the interior of the airbag through an opening 21 contained in the airbag 13, whereby the airbag 13 additionally has an opening 22 for the penetration of the screw neck 15 of the gas generator 14, as well as an opening 23 for the penetration of the face neck 17 of the gas generator. The opening 23 is dimensioned in such a way that it can be shifted over the face neck 17 of the gas generator 14 by expanding it. The seal is achieved by inserting the collar 18.

As FIG. 2 shows in detail, the arrangement is made in such a way that the airbag 13 is inserted with the retaining unit 20. The retaining unit 20 comprises, for instance, a retaining plate made of metal, that is inserted between the bottom 26 of the module housing 10 and the gas generator 14 in a non-fixed or loose attachment so that the airbag 13 is fixed during its unfolding as indicated in FIG. 2 by means of the retaining unit 20 retained by the gas generator 14. If high tensile forces briefly occur with the activation of the gas generator, the retaining unit 20 can deform itself around the gas generator attached in the module housing 10 so that the forces applied to the airbag fabric are deflected via the retaining unit and the gas generator 14 into the module housing 10. It will be appreciated that the airbag fabric of the airbag 13 envelops the retaining unit 20 in a large surface area, and that the airbag supports itself on the retaining unit without weakening or stressing the airbag fabric, for instance, by means of an opening for attachment means.

Figure 3:
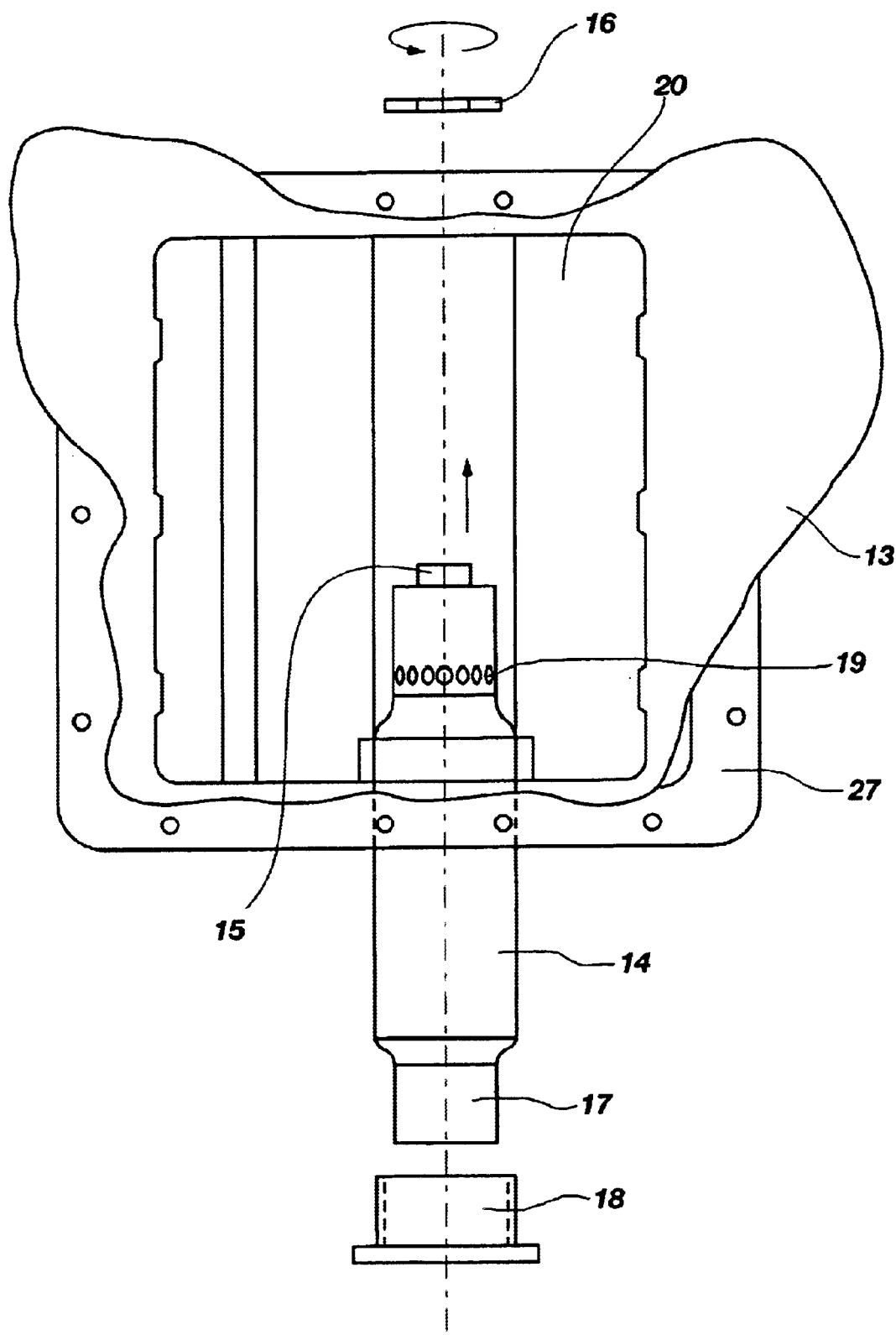
FIG. 3 is an exploded illustration of the separate parts of the airbag module of FIG. 1.

FIG. 3 shows the basic principle of a simple assembly of the airbag, which consists in a first step of inserting the retaining unit 20 through the opening 21 into the airbag 13; in a second step the retaining unit 20 enclosed by the airbag 13 is positioned on the bottom 26 of the module housing 10; next, the gas generator 14 is pushed into both the interior of the module housing 12 as into the interior of the airbag 13 through an opening in the face wall 12 of the module housing 10. The gas generator 14 enters into the interior of the airbag by expanding the opening 23 until the screw neck 15 is extended through the opening 22 of the airbag 13. The neck 15 is fixed onto in the assigned opening of the face wall 12 of the module housing 10 and screwed on by means of the nut 16. Subsequently, the collar 18 is inserted into the face wall 12 of the module housing 10 from the insertion side, and attached on the face neck 17 of the gas generator 14 by means of pressing it on to form a seal.

Figure 5:
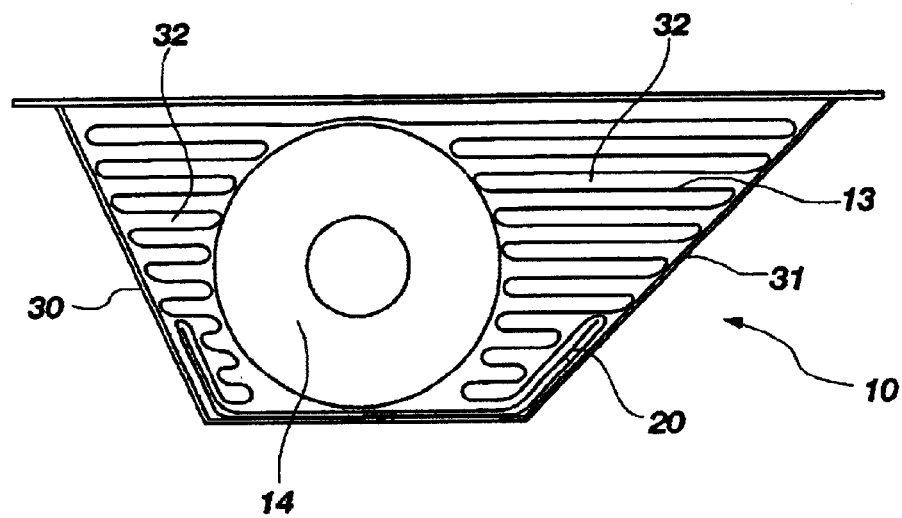
FIG. 5 is a different embodiment example of the airbag module in its illustration according to FIG. 1.

In the embodiment examples illustrated in FIG. 5, the tub-shaped module housing 10 is embodied asymmetrically to the gas generator 14 with a steeply inclining sidewall 30, and with a flat inclining sidewall 31. The airbag 13 is folded into the two folds 32 that are formed between the gas generator 14 and the respective sidewall 30 or 31 in an adjusted asymmetrical fold, whereby the airbag 13 overlaps the gas generator 14 with only one fabric layer. One layer of the airbag 13 extends between the retaining unit 20 inserted into the interior of the airbag and the bottom 26 of the module housing 10 in the same manner. At the same time, the retaining unit 20 has a contour that is adjusted to the shape of the sidewalls 30 and 31.

Figure 6:
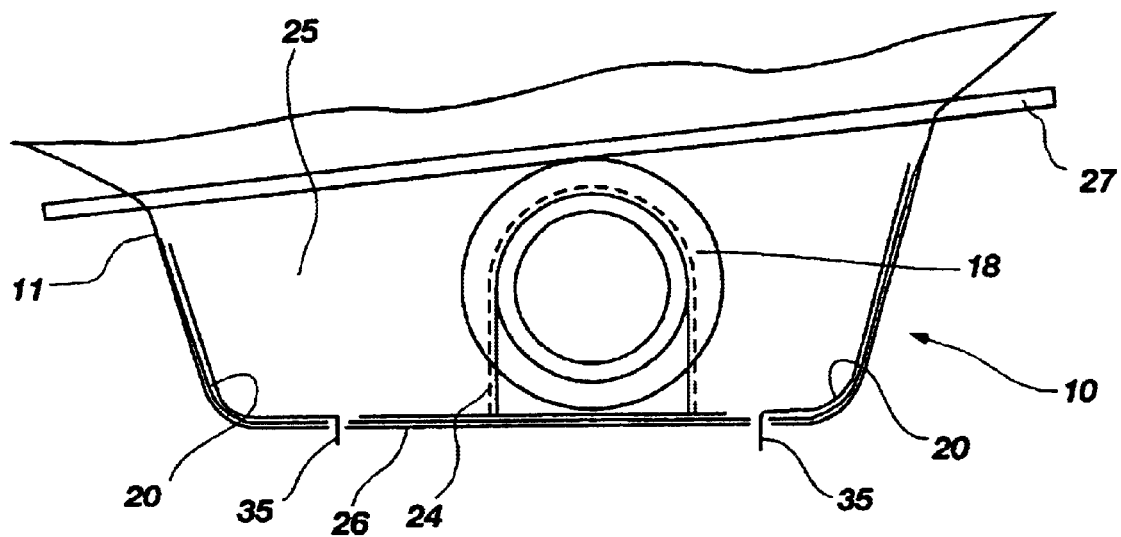
FIG. 6 is an additional embodiment example of the airbag module in the illustration according to FIG. 1.

As FIG. 6 shows, it may be provided for the proper positioning of the retaining unit during assembly, or for its position fixation, that tabs 35 protrude from the level of the retaining unit 20, which themselves engage into respectively provided openings in the airbag fabric, and in the housing 10.

The characteristics of the subject of these documents disclosed in the preceding description, the patent claims, the abstract, and the drawing can be utilized individually or in any combination for the creation of the invention in its various embodiments. The present invention may be embodied in other specific forms without departing from its structures, methods, or other characteristics as described herein and claimed hereinafter. The described embodiments are to be considered only as illustrative, and not restrictive.

What is claimed is:

1. An airbag module comprising:
   a gas generator;
   an airbag comprised of airbag fabric, having an airbag interior;
   a housing; and
   a retaining unit for the fixation of the airbag fabric against the housing, whereby the gas generator and the retaining unit are arranged in the interior of the airbag, and the gas generator is locally fixed on the housing, wherein the retaining unit is disposed between the gas generator and the housing without any force-receiving attachment, and wherein the airbag fabric extends between the retaining unit and the housing, and the airbag fabric presses the retaining unit against the gas generator when the airbag is unfolded so that stress forces may be transferred to the gas generator.

2. The airbag module according to claim 1, wherein the retaining unit has a contour that is adjusted to the shape of the housing.

3. The airbag module according to claim 1, wherein the retaining unit has at least one tab that protrudes from the level of the retaining unit and penetrates the airbag fabric and the housing wall in assigned openings for its positional fixation within the airbag.

4. The airbag module according to claim 3, wherein the retaining unit is locally fixed opposite of the housing by means of two tabs.

5. The airbag module according to claim 1, wherein the retaining unit is deformable.

6. The airbag module according to claim 1, wherein the retaining unit is plastic.

7. The airbag module according to claim 1, wherein the retaining unit is embodied as a metal retaining plate.

8. The airbag module according to claim 1, wherein the retaining unit is equipped with a diffuser for leading gas into the unfolding airbag.

9. The airbag module according to claim 1, wherein openings are disposed in the bottom of the module housing that extend parallel to the gas generator for the entry of a layer of the airbag fabric that extends across the bottom.

10. The airbag module according to claim 1, wherein the airbag has a sufficiently large first opening for inserting the retaining unit into its interior.

11. The airbag module according to claim 10, wherein gas generator has two ends and wherein the airbag has one additional opening, wherein the first opening and the additional opening receive the two ends of the gas generator.

12. The airbag module according to claim 11, wherein the openings in the airbag that receive the two ends of the gas generator are adjusted in their dimension to accommodate means for attaching the gas generator ends to the housing.

13. The airbag module according to claim 1, wherein the gas generator has a first face end comprising a screw neck that is configured to be attached to corresponding bore disposed in a first face wall of the housing, and the airbag comprises an opening through which the gas generator is inserted into the airbag interior, wherein the gas generator first face end is inserted into the airbag interior and the screw neck is positioned within the bore to form a seal with the first face wall of the housing, and the screw neck is attached to the first face wall of the housing by means of an attached nut.

14. The airbag module according to claim 13, wherein the gas generator has a second face end which is attached to the housing to form a seal by means of a collar that is inserted from the exterior through a corresponding opening disposed in a second face wall of the housing and that is received by a second face neck of the gas generator.

15. The airbag module according to claim 1, wherein the module housing is embodied with two sidewalls that are arranged to envelope an obtuse angle between themselves in a tub-like fashion parallel to a longitudinal axis of the gas generator, and two face walls each connecting the two sidewalls.

16. The airbag module according to claim 15, wherein the module housing is embodied asymmetrical to the gas generator with a steeply inclining sidewall and with a shallow inclining sidewall.

17. The airbag module according to claim 16, wherein the airbag is folded into the two folds formed between the gas generator and the two sidewalls in an asymmetrically adjusted fold, and that overlaps the gas generator with only one fabric layer.

18. The airbag module according to claim 16, wherein the retaining unit has a contour that is adjusted to the shape of the sidewalls.

19. The airbag module according to claim 1, wherein the housing has a discharge opening, the airbag module further comprising a retaining loop attached to the housing opposite the discharge opening and which extends into the airbag interior and wraps around the gas generator.

20. The airbag module according to claim 1, wherein the retaining unit has a contour that is adjusted to the shape of the housing and has at least one tab that protrudes from the retaining unit and penetrates the airbag fabric and the housing wall in assigned openings for its positional fixation within the airbag, wherein the airbag has a sufficiently large opening for inserting the retaining unit into its interior, wherein the gas generator has two ends and wherein the airbag has openings for receiving the two ends of the gas generator, wherein the openings are adjusted in their dimension to accommodate means for attaching the gas generator ends to the housing, and wherein the housing has a discharge opening, the airbag module further comprising a retaining loop attached to the housing opposite the discharge opening and which extends into the airbag interior and wraps around the gas generator.

* * * * *

UNITED STATES PATENT AND TRADEMARK OFFICE
CERTIFICATE OF CORRECTION

PATENT NO. : 6,877,767 B2
DATED : April 12, 2005
INVENTOR(S) : Thomas Reiter

It is certified that error appears in the above-identified patent and that said Letters Patent is hereby corrected as shown below:

Column 3,
Line 31, please delete "dimensionedsufficiently" and replace it with -- dimensioned sufficiently --.

Signed and Sealed this

Sixteenth Day of August, 2005

JON W. DUDAS
*Director of the United States Patent and Trademark Office*